US012710803B2

(12) United States Patent
Mohanty

(10) Patent No.: US 12,710,803 B2
(45) Date of Patent: Aug. 18, 2026

(54) DYNAMIC HIBERNATION OF ON-PREMISE SERVERS

(71) Applicant: Bank of America Corporation, Charlotte, NC (US)

(72) Inventor: Swetapadma Mohanty, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 140 days.

(21) Appl. No.: 18/910,682

(22) Filed: Oct. 9, 2024

(65) Prior Publication Data

US 2026/0099189 A1 Apr. 9, 2026

(51) Int. Cl.

| | |
|---|---|
| ***G06F 1/00*** | (2006.01) |
| ***G06F 1/3209*** | (2019.01) |
| ***G06F 1/3287*** | (2019.01) |
| ***H04L 67/1008*** | (2022.01) |

(52) U.S. Cl.

CPC .......... *G06F 1/3287* (2013.01); *G06F 1/3209* (2013.01); *H04L 67/1008* (2013.01)

(58) Field of Classification Search

CPC ... G06F 1/3287; G06F 1/3209; H04L 67/1008

See application file for complete search history.

(56) References Cited

U.S. PATENT DOCUMENTS

| | | | | |
|---|---|---|---|---|
| 7,783,907 B2 | | 8/2010 | Dubinsky | |
| 8,225,119 B2 | * | 7/2012 | Jain | G06F 9/5094 713/323 |
| 8,230,249 B2 | * | 7/2012 | Dasgupta | G06F 9/5094 713/323 |
| 8,250,382 B2 | | 8/2012 | Maglione et al. | |
| 9,264,296 B2 | | 2/2016 | Maldaner | |
| 9,712,647 B2 | | 7/2017 | Bird | |
| 10,506,033 B2 | | 12/2019 | Cui et al. | |
| 11,169,883 B1 | | 11/2021 | Burgin et al. | |
| 12,599,335 B2 | * | 4/2026 | Cho | A61B 5/4818 |
| 2006/0184287 A1 | * | 8/2006 | Belady | G06F 1/3287 700/291 |
| 2017/0208121 A1 | * | 7/2017 | Granshaw | G06F 9/5061 |
| 2018/0113503 A1 | * | 4/2018 | Sterns | G06F 1/3296 |
| 2019/0116128 A1 | * | 4/2019 | Guo | H04L 67/1021 |

FOREIGN PATENT DOCUMENTS

| | | | | |
|---|---|---|---|---|
| EP | 3798930 A2 | * | 3/2021 | G06N 3/08 |
| EP | 3522466 B1 | | 4/2021 | |

* cited by examiner

*Primary Examiner* — Xuxing Chen

(74) *Attorney, Agent, or Firm* — Banner & Witcoff, Ltd.

(57) ABSTRACT

Arrangements for providing dynamic hibernation of on-premise servers are provided. In some examples, a computing platform may receive server metric data indicating a workload associated with a plurality of servers in a system. The server data may be analyzed to determine whether a current time is an off-peak time. If so, the current workload data may be compared to a threshold. If the workload is below the threshold, the computing platform may identify one or more servers to transition to a hibernation state. Workload data may be continuously received and analyzed during the off-peak time to dynamically modify a state (e.g., active or hibernation) of servers within the system to reduce carbon footprint and environment impact associated with server processing.

20 Claims, 10 Drawing Sheets

DYNAMIC HIBERNATION OF ON-PREMISE SERVERS

BACKGROUND

Aspects of the disclosure relate to electrical computers, systems, and devices for dynamic control of on-premise servers to balance resources and reduce carbon emissions.

Reducing the carbon emissions or footprint associated with the information technology industry and with information technology departments within enterprise organizations is an important goal. While the use of cloud-based infrastructure and green energy has improved the carbon emissions associated with information technology departments, in some examples, on-premise servers are still used. Further, in some arrangements, green energy sources might not be readily available at all locations. Accordingly, arrangements described herein provide for dynamic hibernation of on-premise servers in order to efficiently balance workload of servers and reduce carbon emissions.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated with controlling on-premise server operations to reduce carbon footprint.

In some examples, a computing platform may receive server metric data indicating a workload associated with a plurality of servers in a system. The server data may be analyzed to determine whether a current time is an off-peak time. If so, the current workload data may be compared to a threshold. If the workload is below the threshold, the computing platform may identify one or more servers to transition to a hibernation state. Workload data may be continuously received and analyzed during the off-peak time to dynamically modify a state (e.g., active or hibernation) of servers within the system to reduce carbon footprint and environment impact associated with server processing.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, on-premise servers using non-green energy can be large sources of carbon emissions. In some examples, on-premise servers using non-green energy may emit six times more carbon than cloud-based infrastructure using green energy sources. Accordingly, it would be advantageous to dynamically control the state of on-premise servers (e.g., between active and standby or hibernation) in order to reduce carbon emissions when possible (e.g., when workload is reduced).

Aspects described herein are related to using machine learning to predict off-peak times (e.g., times when workload is reduced) and control the state of one or more servers in a system for peak and off-peak times. In some examples, server data may be continuously monitored and server states may be dynamically modified during predicted off-peak times.

These and various other arrangements will be discussed more fully below.

Figure 1A:
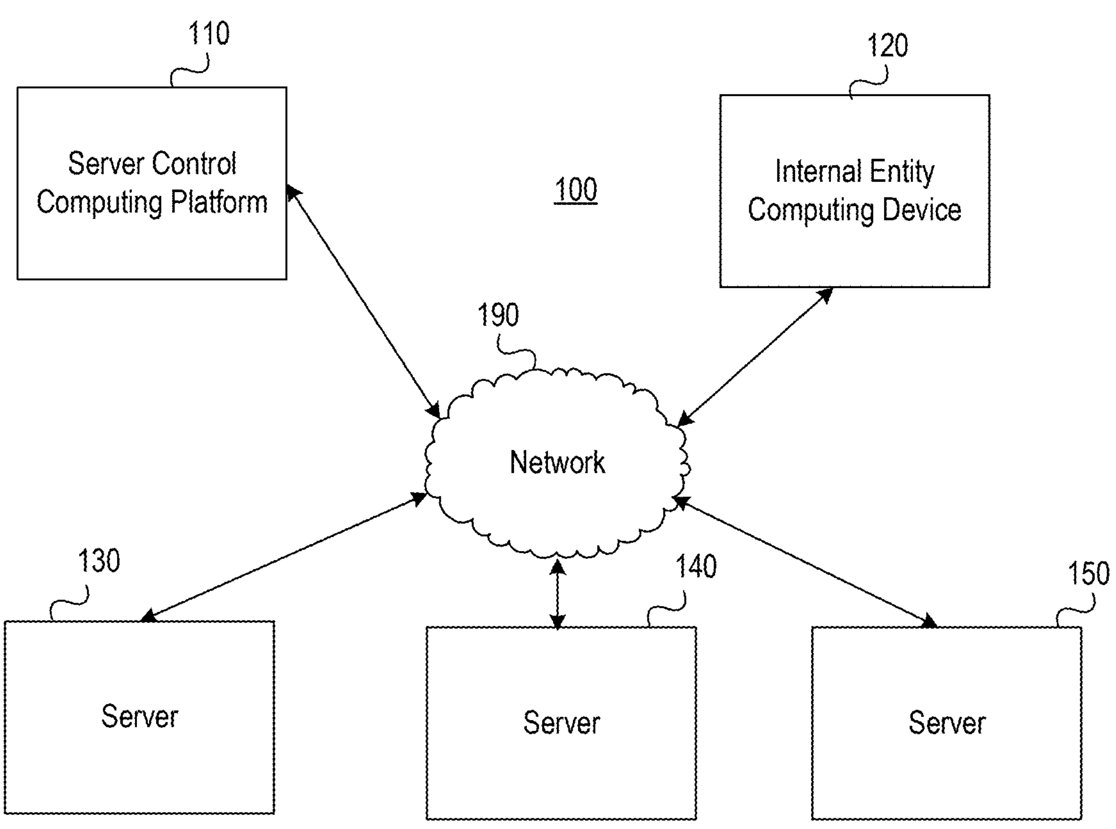
FIGS. 1A-1B depict an illustrative computing environment for implementing dynamic hibernation of on-premise servers in accordance with one or more aspects described herein.
Figure 1B:
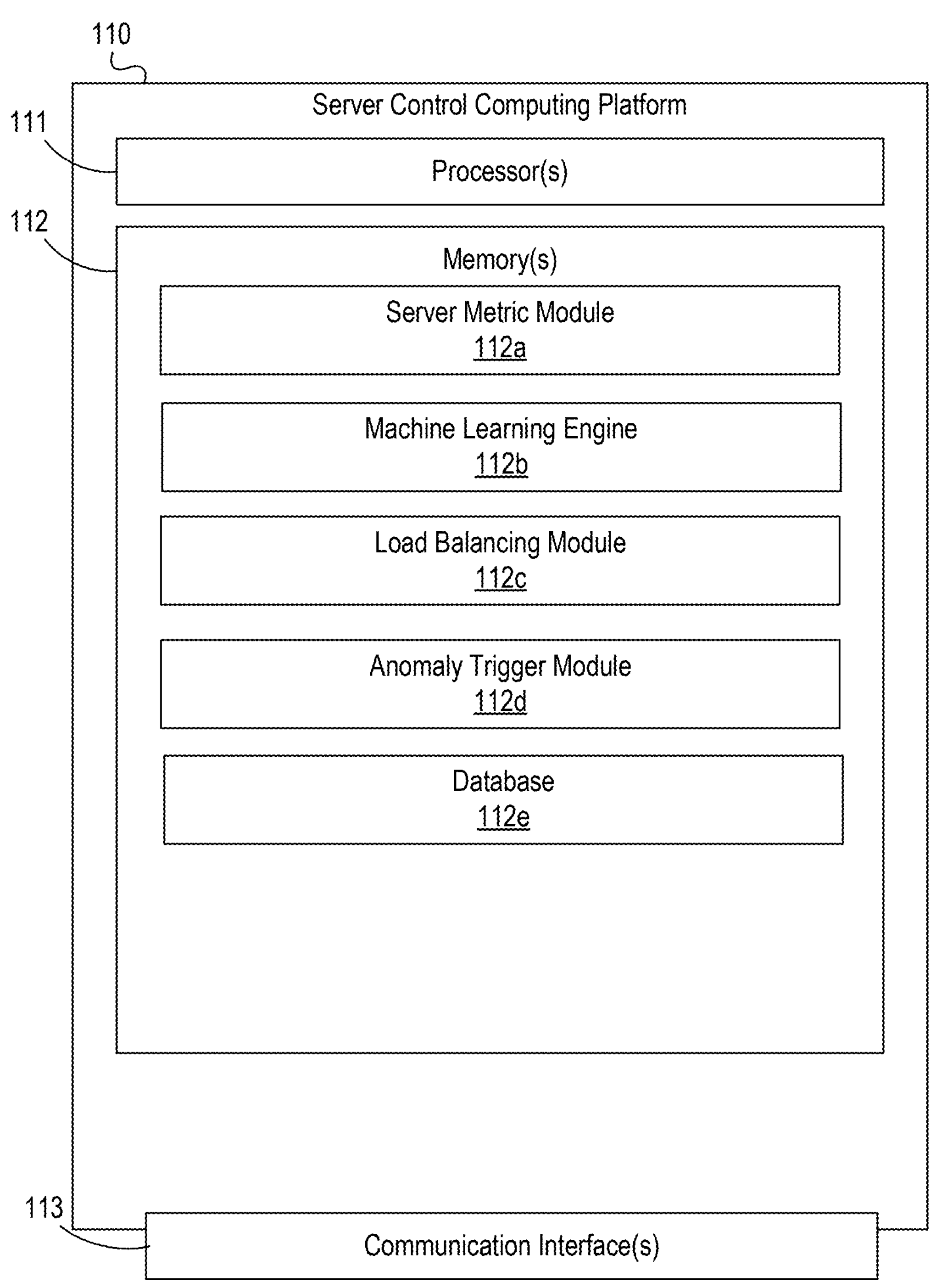

FIGS. 1A-1B depict an illustrative computing environment and devices for dynamic hibernation of on-premise servers in accordance with one or more aspects described herein. Referring to FIG. 1A, computing environment 100 may include one or more computing devices and/or other computing systems. For example, computing environment 100 may include server control computing platform 110, internal entity computing device 120, first server 130, second server 140 and third server 150.

Although one internal entity computing device 120 and three servers, 130, 140, 150 are shown, any number of systems or devices may be used without departing from the invention.

Server control computing platform 110 may be include one or more computer components (e.g., servers, server blade, processor, memory, and the like) and may be configured to perform intelligent, dynamic, seamless dynamic hibernation of on-premise servers. For instance, server control computing platform 110 may receive one or more server metrics from a plurality of servers in a system. The metrics may include central processing unit (CPU) usage, disk usage, memory usage, percent busy, network usage, and the like. A machine learning algorithm may be used to identify usage patterns in the data. For instance, a random forest technique may be used to identify usage patterns in the server metric data to identify peak times (e.g., times when workload on the servers is high) and off-peak times (e.g., times when workload on the servers is low or lower). In some examples, outliers may be identified, such as end of month, end of quarter, or the like, when higher than typical loads are experience, even in a typical off-peak time period. For instance, off-peak times may be identified as weekends (e.g., Saturdays and Sundays). However, end of quarter processing might require additional processing that may be performed on the weekend in order to avoid disrupting typical business workloads during the week. Accordingly, those end of quarter times might be considered outliers and will be analyzed by the machine learning model when determining off-peak times and servers for hibernation.

Server control computing platform 110 may execute a load balancing operation to distribute workload among the plurality of servers in the system. A current system usage (e.g., CPU usage) may be determined after the workload is distributed. This current system usage may be analyzed using a machine learning model to determine whether to modify a state of any servers in the plurality of servers to inactive or standby (e.g., hibernate any servers). For instance, the current system usage may be compared to a threshold system usage for hibernating one or more servers. If the current system usage is at or above the threshold, the status of all servers in the system may be maintained and the server control computing platform 110 may continuously monitor the current system usage.

If the current system usage is below the threshold, the machine learning model may identify one or more servers of the plurality of servers for hibernation. For instance, a current system may include 10 servers and the usage threshold may be 70%. If a current system usage is 60%, that is below the threshold and the machine learning model may identify 4 servers to hibernate (e.g., 40% of the CPU usage). The server control computing platform 110 may continuously monitor the current system usage to identify a point when the threshold is met. Once the threshold is met, the machine learning model may output one or more servers to move to an activate state. For instance, if a current system usage at a later time is 80%, the machine learning model may identify that 2 servers (of the 4 in hibernation) should be moved to an active state to accommodate the increased workload. After activating the two servers, a load balancing operation may be performed to distribute the current workload across the 8 active servers and a current usage may be determined. If, with the 8 active servers, the workload is still above the threshold, one or more additional servers may be activated by the server control computing platform 110. Accordingly, continuous monitoring of workload, available servers, and the like, may be performed to ensure efficient load balancing.

Internal entity computing device 120 may be or include one or more computing devices (e.g., laptop computers, desktop computers, mobile devices, tablet devices, or the like) that may be used by an employee or other user of the enterprise organization implementing the server control computing platform 110. In some examples, internal entity computing device 120 may receive and display one or more notifications, dashboards, or other user interfaces providing data related to current workload, online and offline servers, and the like. In some examples, internal entity computing device 120 may be configured to manually override the automatic load balancing operations described herein to activate one or more hibernating servers in order to address, for instance, unexpected increases in workload (e.g., imports of large amounts of data, or the like).

Servers 130, 140, 15 may be or include one or more computer components (e.g., servers, server blades, processor, memory, or the like) and may host or execute one or more functions of the enterprise organization. In some examples, the servers may be on-premise servers (e.g., as opposed to cloud-based servers). The servers 130, 140, 150 may be configured to move between an active or online state and an inactive or offline state (e.g., hibernation) based on workload, energy availability, and the like, in order to efficient process data.

As mentioned above, computing environment 100 also may include one or more networks, which may interconnect one or more of server control computing platform 110, internal entity computing device 120, first server 130, second server 140 and/or third server 150. For example, computing environment 100 may include network 190. Network 190 may, in some examples, be a private network and include one or more sub-networks (e.g., Local Area Networks (LANs), Wide Area Networks (WANs), or the like). Network 190 may interconnect one or more computing devices associated with the organization. For example, server control computing platform 110, internal entity computing device 120, first server 130, second server 140 and/or third server 150 may be connected via network 190.

Referring to FIG. 1B, server control computing platform 110 may include one or more processors 111, memory 112, and communication interface 113. A data bus may interconnect processor(s) 111, memory 112, and communication interface 113. Communication interface 113 may be a network interface configured to support communication between server control computing platform 110 and one or more networks (e.g., network 190, or the like). Memory 112 may include one or more program modules having instructions that when executed by processor(s) 111 cause server control computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of server control computing platform 110 and/or by different computing devices that may form and/or otherwise make up server control computing platform 110.

For example, memory 112 may have, store and/or include server metric module **112*a*. Server metric module 112*a* may store instructions and/or data that may cause or enable the server control computing platform 110 to receive metric data from a plurality of on-premise servers, such as server 130, server 140 and/or server 150**. In some examples, the metrics may include central processing unit (CPU) usage, disk usage, memory usage, percent busy, network usage. In some arrangements, the server metric data received may include outlier data. For instance, if occurrences of high data processing have occurred but are not part of a regular processing routine, the data may be captured as outlier data and used to train one or more machine learning models.

Server control computing platform 110 may further have, store and/or include machine learning engine **112*b*. Machine learning engine 112*b* may store instructions and/or data that may cause or enable the server control computing platform 110** to train, execute, update and/or validate one or more machine learning models to receive, as inputs, server metric data and generate or output one or more off-peak times for server operation. Additionally or alternatively, the one or more machine learning models may receive, as inputs, current server workload data and output an optimal number of servers to operate during that period. In some examples, current workload may be compared to a threshold workload to determine a number of servers for active use, a number of servers to hibernate, or the like.

The machine learning model may be trained using previously captured and/or historical data related to server metrics, server use, server workload, time and day data, and the like. For instance, the machine learning model may be trained using previous server workload data and time and day data to identify patterns, sequences and/or correlations between the workload, date and/or time, and, in some examples, number of servers active at that time. In some examples, outlier data (e.g., scheduled and/or unscheduled additional data processing requests that may be outside of typical or expected workloads) may be used to further train the machine learning model to identify off-peak times. Further, the machine learning model may be trained using historical workload, date and time, and/or server activity data may be used to identify patterns, sequences and correlations between a number of servers operating and a particular workload. Accordingly, as additional or current server metric and/or workload data is received, the machine learning model may be executed to identify an off-peak time and identify a number of servers to be active during the time, a number of servers to hibernate during the time, or the like (e.g., based on current workload compared to a threshold workload).

In some examples, the machine learning model may be or include one or more supervised learning models (e.g., decision trees, bagging, boosting, random forest, neural networks, linear regression, artificial neural networks, logical regression, support vector machines, and/or other models), unsupervised learning models (e.g., clustering, anomaly detection, artificial neural networks, and/or other models), knowledge graphs, simulated annealing algorithms, hybrid quantum computing models, and/or other models. In some examples, training the machine learning model may include training the model using labeled data (e.g., labeled data including server metrics, server active/hibernation state, day of week, time of day, and the like) and/or unlabeled data.

Accordingly, machine learning engine 112*b* may receive, as inputs, current server workload, current status of each on-premise server, day of week, time of day, and the like, and may determine whether an off-peak time is detected, identify a number of servers for active use, identify one or more servers for hibernation, or the like.

Server control computing platform 110 may further have, store and/or include load balancing module 112*c*. Load balancing module 112*c* may store instructions and/or data that may cause or enable the server control computing platform 110 to execute a load balancing operation on current active servers and current server workload to distribute workload across active servers. After the load balancing operation is executed, current workload data may be received and analyzed, using, for instance, the machine learning model, to determine whether one or more servers should be activated, put in hibernation, or the like. In some examples, the machine learning model may compare the current workload to a threshold workload to determine an optimal number of servers for use, identify servers to activate or hibernate, or the like. A load balancing operation may be executed again after modifying active/hibernating servers and additional current workload data may be received. Accordingly, the process may be continuous to continuously evaluate workload, balance workload, and activate/deactivate servers based on current workload and balanced workload.

Server control computing platform 110 may further have, store and/or include anomaly trigger module 112*d*. Anomaly trigger module 112*d* may store instructions and/or data that may cause or enable the server control computing platform 110 to detect an anomaly (e.g., a higher than expected server workload, one or more server metrics that are higher than expected) and transfer control of the server balancing operation to a manual process. For instance, if an anomaly is detected, the system may override the automatic system described and provide for manual control of servers to activate/hibernate, or the like.

Server control computing platform 110 may further have, store and/or include database 112*e*. Database 112*e* may store data related to server metrics, on peak and off-peak times, anomalies, outlier data, and/or other data to perform the functions of the server control computing platform 110.

FIGS. 2A-2E depict one example illustrative event sequence for dynamic hibernation of on-premise servers in accordance with one or more aspects described herein. The events shown in the illustrative event sequence are merely one example sequence and additional events may be added, or events may be omitted, without departing from the invention. Further, one or more processes discussed with respect to FIGS. 2A-2E may be performed in real-time or near real-time.

Figure 2A:
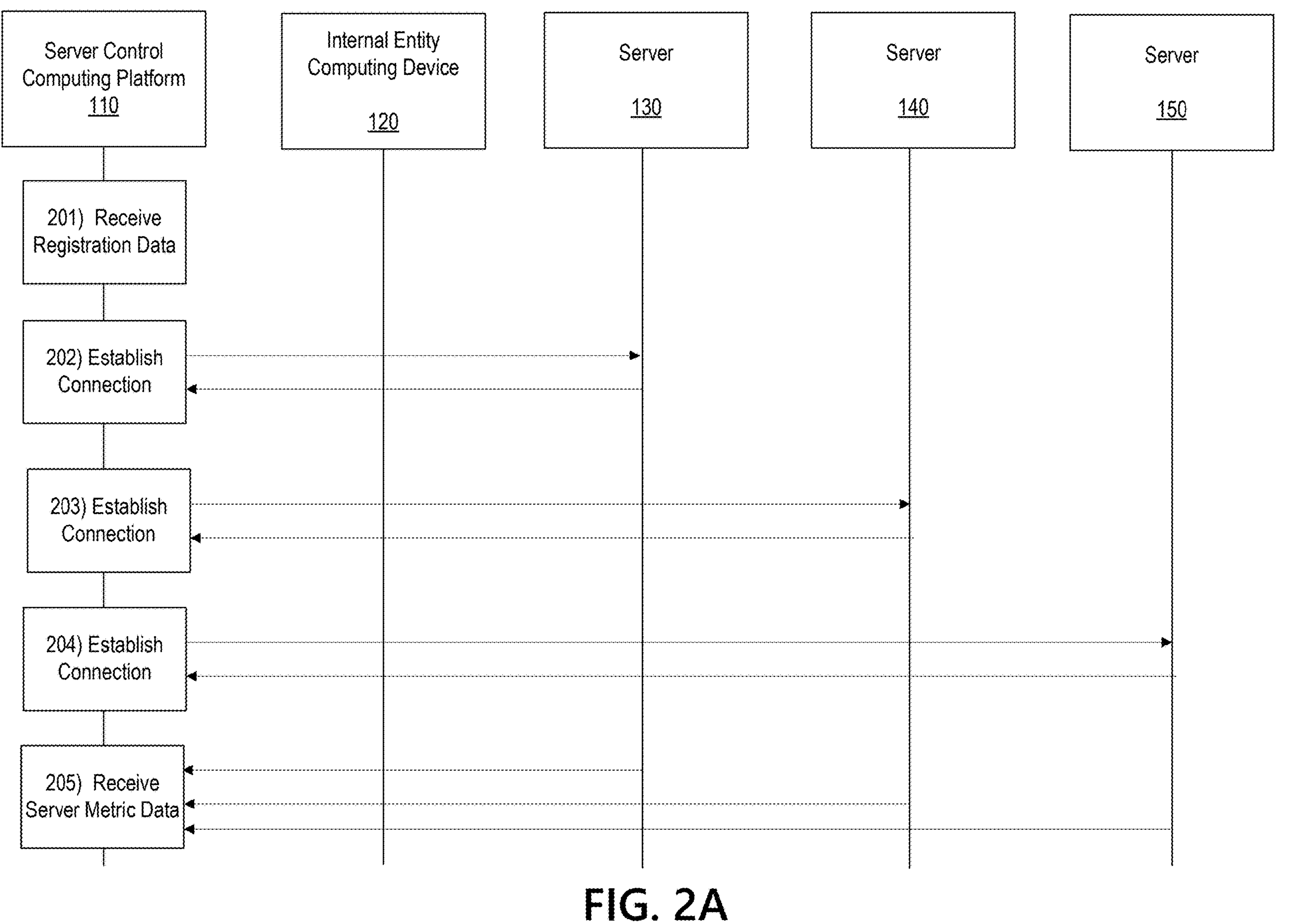
FIGS. 2A-2E depict an illustrative event sequence for dynamic hibernation of on-premise servers in accordance with one or more aspects described herein.

With reference to FIG. 2A, at step 201, server control computing platform 110 may receive registration data. For instance, one or more on-premise servers in a system (e.g., associated with an enterprise organization) may be registered with the server control computing platform 110. Accordingly, the registered servers may be monitored, communicate with the server control computing platform 110 to provide server metric and/or workload data, hibernate or activate based on instructions from the server control computing platform 110, and the like.

At step 202, server control computing platform 110 may establish a wireless data connection with server 130. For instance, server control computing platform 110 may establish a first wireless data connection with server 130. Upon establishing the first data wireless connection, a communication session may be initiated between server control computing platform 110 and server 130.

At step 203, server control computing platform 110 may establish a wireless data connection with server 140. For instance, server control computing platform 110 may establish a second wireless data connection with server 140. Upon establishing the second data wireless connection, a communication session may be initiated between server control computing platform 110 and server 140.

At step 204, server control computing platform 110 may establish a wireless data connection with server 150. For instance, server control computing platform 110 may establish a third wireless data connection with server 150. Upon establishing the third data wireless connection, a communication session may be initiated between server control computing platform 110 and server 150.

Although three servers are shown and described, any number of on-premise servers may be used without departing from the invention.

At step 205, server control computing platform 110 may receive server metric data from servers 130, 140, and 150. For instance, metrics such as central processing unit (CPU) usage, disk usage, memory usage, percent busy, network usage, and the like, that may indicate server workload, may be received from servers 130, 140 and/or 150. The data may be received at one or more days of the week, times of day, days in a month, or the like.

Figure 2B:
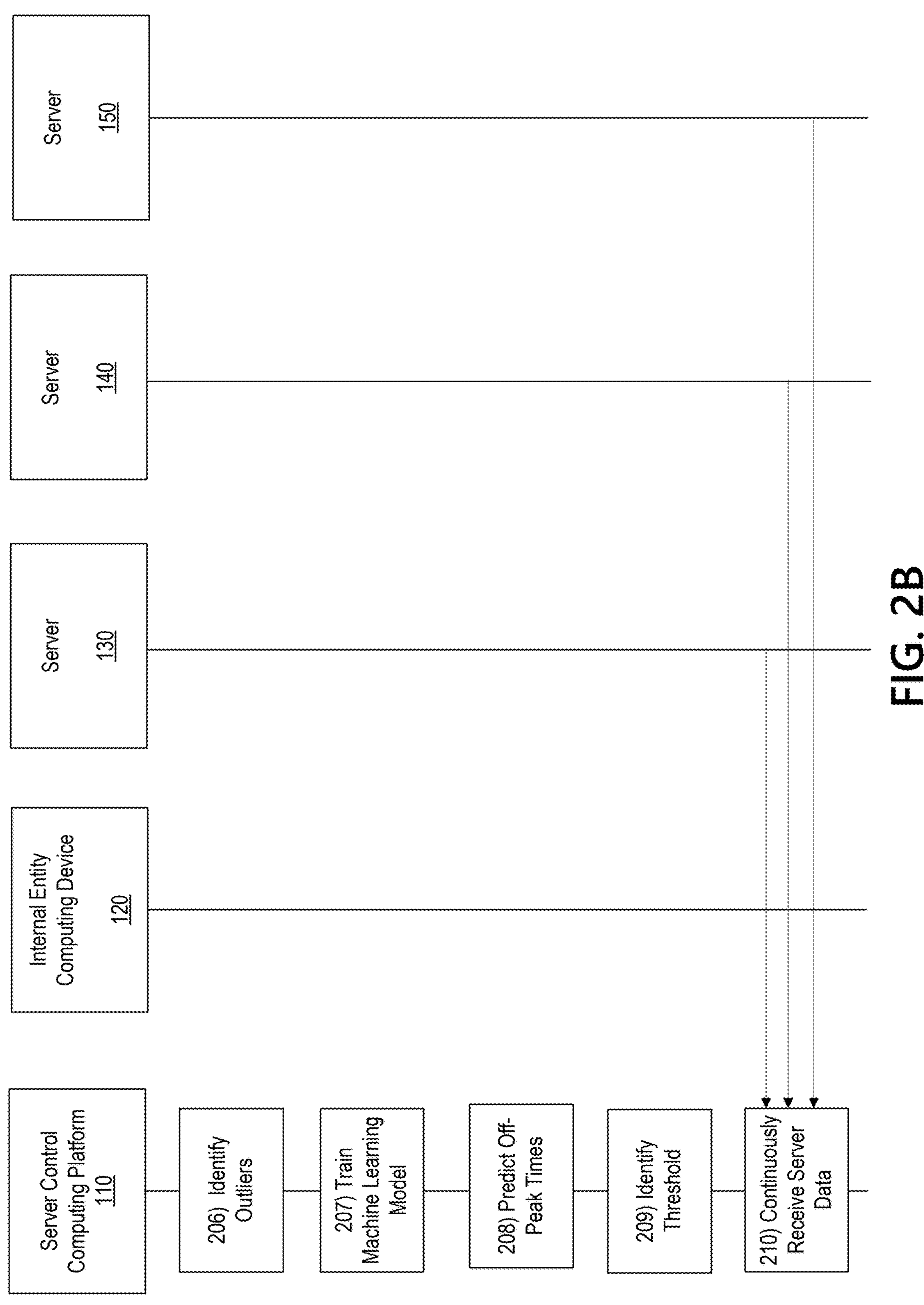

With reference to FIG. 2B, at step 206, server control computing platform 110 may identify one or more outlier occurrences. For instance, server control computing platform 110 may identify one or more unexpected data processing or transfer operations that were outside a norm for a particular day, time, or the like. These outliers may be used, along with server metric data, in training the machine learning model to identify off-peak times.

At step 207, server control computing platform 110 may train a machine learning model. For instance, the received server metric data (e.g., data indicating a workload on servers at various days of the week, times of the day, and the like) and the identified outlier data may be used to train a machine learning model to predict off-peak times, determine a threshold for efficient server operations and identify one or more servers to activate hibernate from a plurality of servers in a system. For instance, in some examples, a random forest technique may be used to analyze the data to identify peak and off-peak times (e.g., times of a day, day of a week, day of a month, or the like). In some examples, the random forest technique may also be used to train the machine leaning model to determine a load threshold to evaluate current workloads against to determine whether one or more servers should hibernate or be activated from hibernation during an off-peak time. For instance, the data received may be used to train the machine learning model to use, as inputs, subsequent server metric data indicating a current workload and output, based on the data, a determination of whether the current time corresponds to an off-peak time and a threshold for modifying server operations. In some examples, the machine learning model may be trained using, for instance, autoscaling or other similar technique to identify servers for hibernation or activation.

At step 208, the machine learning model may be executed to determine whether a current time is an off-peak time. For instance, based on the data used to train the model, the model may receive data related to a current time and determine whether the current time (e.g., day, time, day or month, or the like) corresponds to an off-peak time. If not, the system may continue operating all servers in active more and may continue to monitor the time, workload, and the like.

At step 209, if the current day/time corresponds to an off-peak time (e.g., as determined in step 208), the machine learning model may identify a workload threshold below which one or more servers should hibernate in order to conserve computing resources.

At step 210, server control computing platform 110 may receive current server metric data from server 130, server 140 and/or server 150. In some examples, the server metric data may indicate a workload or utilization of each server.

Figure 2C:
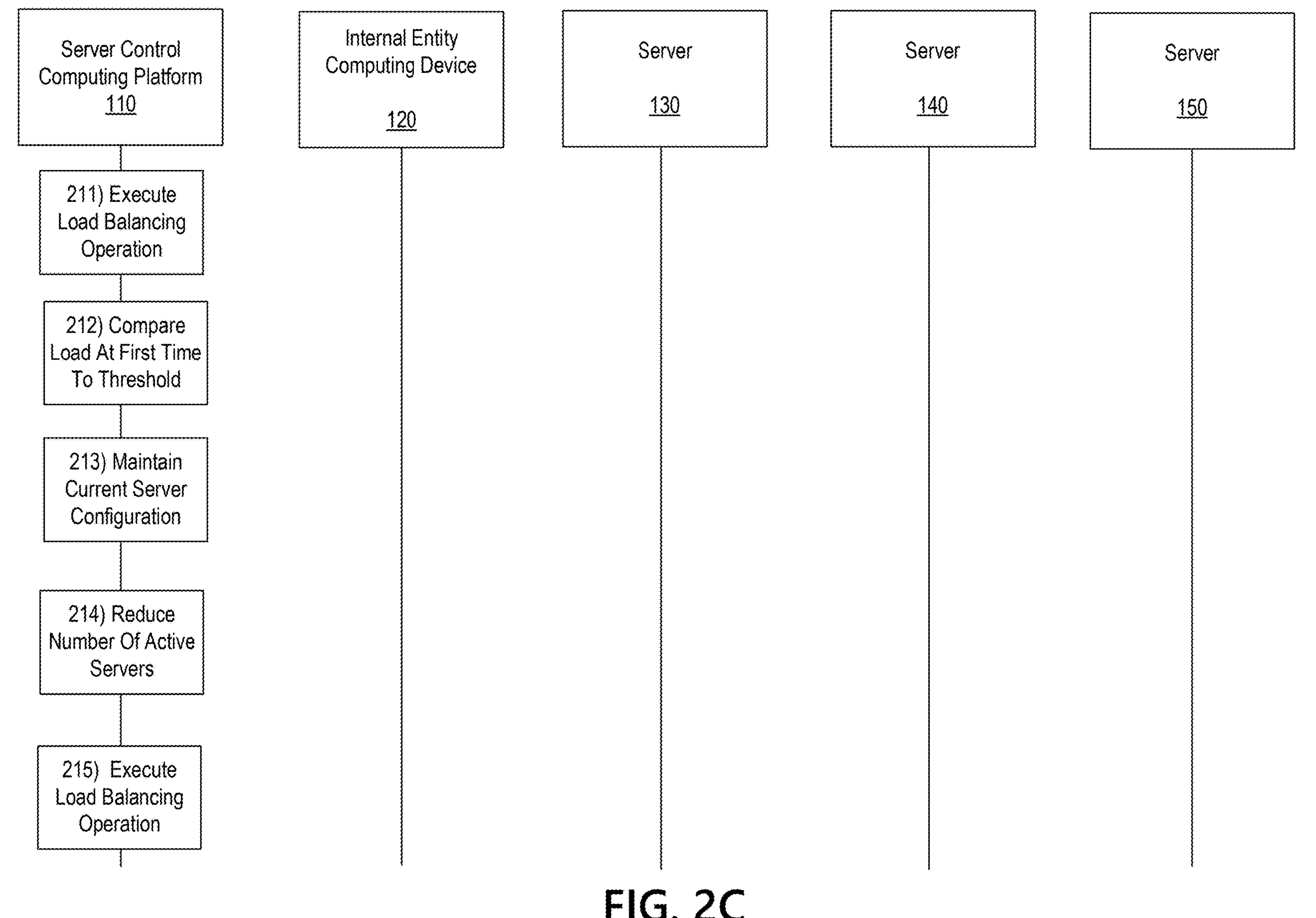

With reference to FIG. 2C, at step 211, server control computing platform 110 may execute a load balancing operation to distribute the received workload or utilization (e.g., based on the continuously received server metric data from server 130, server 140 and/or server 150) across all on-premise active servers in the system.

At step 212, a current workload of the system may be determined for a first time (e.g., based on the balanced load at step 211). The current workload or utilization of the system may be compared to the threshold to determine whether the current workload is below the threshold.

If the current workload is at or above the threshold, at step 213, the current server arrangement may be maintained. For instance, all active servers may remain in an active state to continue processing the workload and the process may proceed to step 216 in FIG. 2D.

If, at step 212, the current workload at the first time is below the threshold, at step 214, a number of active servers may be modified. For instance, one or more active servers may be instructed to hibernate or deactivate in order to reduce computing resources. In some examples, the machine learning model may receive the workload data and identify one or more servers for hibernation. In one example, if a server system includes 10 servers or nodes, and a threshold is 70% usage, if the current workload is at 60%, four nodes may be instructed to hibernate. In instructing the servers to hibernate, server control computing platform 110 may generate and transmit an instruction that, when received by a respective server, may cause the respective server to enter a hibernation mode and not continue to process data.

At step 215, based on the reduced number of servers, server control computing platform 110 may execute the load balancing operation. Accordingly, the current workload may be distributed across the current number of active servers (e.g., not across servers in hibernation).

Figure 2D:
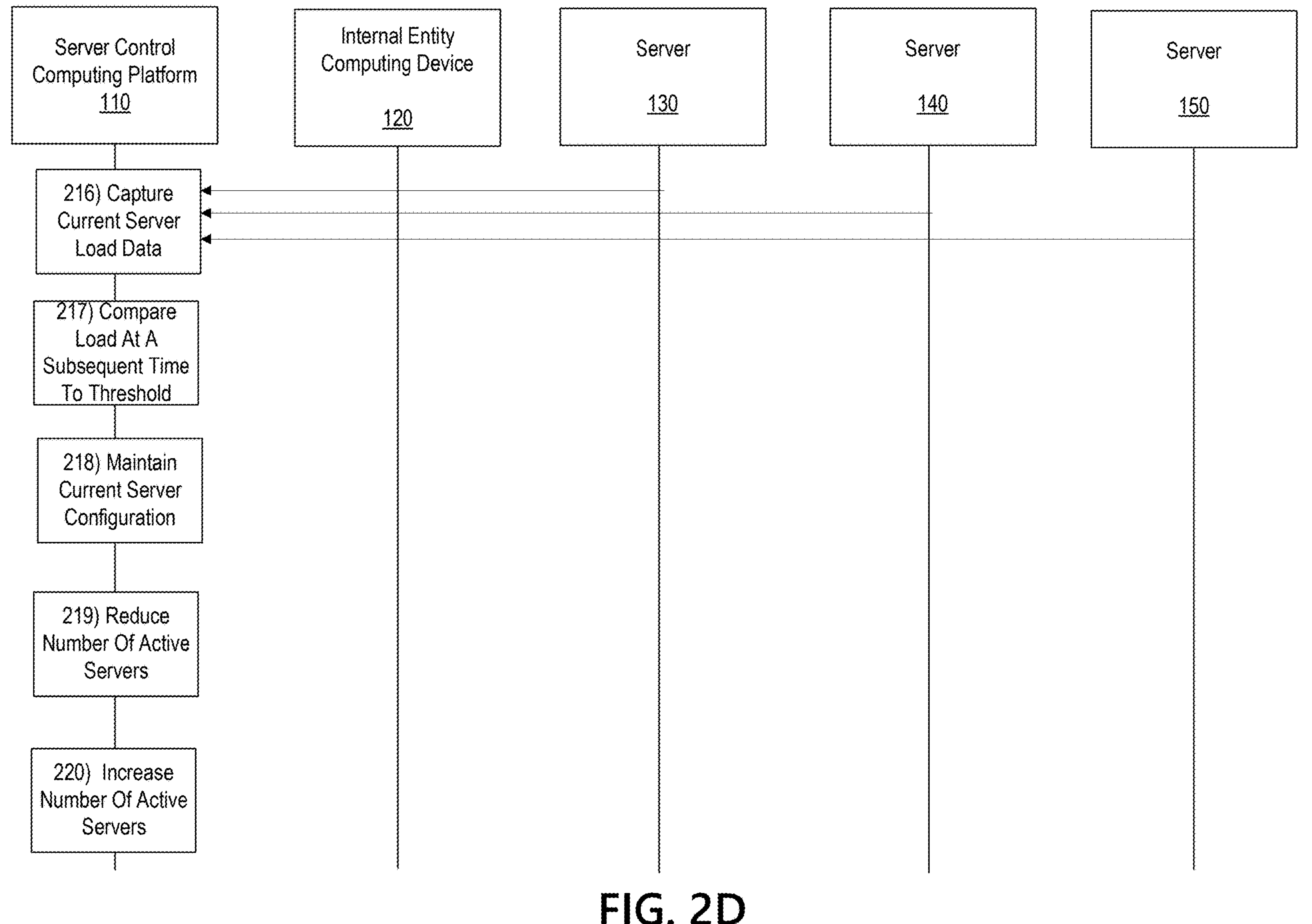

With reference to FIG. 2D, at step 216, server control computing platform 110 may capture current server workload data at a second or subsequent time, after the first time or another previous time. The current workload data may be based on the balanced workload determined after the load balancing operation of step 215 (e.g., across the reduced number of servers). The current workload may be captured based on the continuously received data from server 130, server 140 and/or server 150.

At step 217, server control computing platform 110 may compare the current workload at the second or subsequent time to the threshold. If, at step 217, the current workload is at the threshold, at step 218, the current server configuration may be maintained (e.g., not servers may be activated or deactivated) and the process may return to step 216 to capture subsequent workload data.

If, at step 217, the workload is below the threshold, server control computing platform 110 may identify one or more additional servers to hibernate and further reduce the number of active servers at step 219. In some examples, machine learning may be used to identify the one or more additional servers to hibernate. The server control computing platform 110 may identify the one or more additional servers to hibernate, may generate an instruction causing the one or more additional servers to hibernate, and may transmit the instruction to the one or more additional servers, thereby causing the one or more additional servers to hibernate. The process may then return to step 215 in FIG. 2C to execute a load balancing operation, receive subsequent workload data, and the like, in order to continuously monitor and dynamically adjust on-premise server operation.

If, at step 217, the workload is above the threshold, at step 220, server control computing platform 110 may identify one or more servers currently in hibernation to be reactivated, thereby increasing the number of active servers. In some examples, machine learning may be used to identify one or more servers to be reactivated. The server control computing platform 110 may generate an instruction causing the one or more servers in hibernation to reactivate, and transmit the instruction to the one or more servers currently in hibernation, thereby causing the one or more servers to reactivate. The process may then return to step 215 in FIG. 2C to execute a load balancing operation, receive subsequent workload data, and the like, in order to continuously monitor and dynamically adjust on-premise server operation.

Accordingly, the process may continue to balance a load, receive subsequent workload data, and dynamically adjust a number of active servers throughout the off-peak time period. Once the server control computing platform 110 detects an end of the off-peak time period (e.g., based on expiration of a pre-determined time period, identification of a current time outside of expected off-peak times, or the like), all servers may be activated and may remain in that state until an off-peak time is detected again.

Figure 2E:
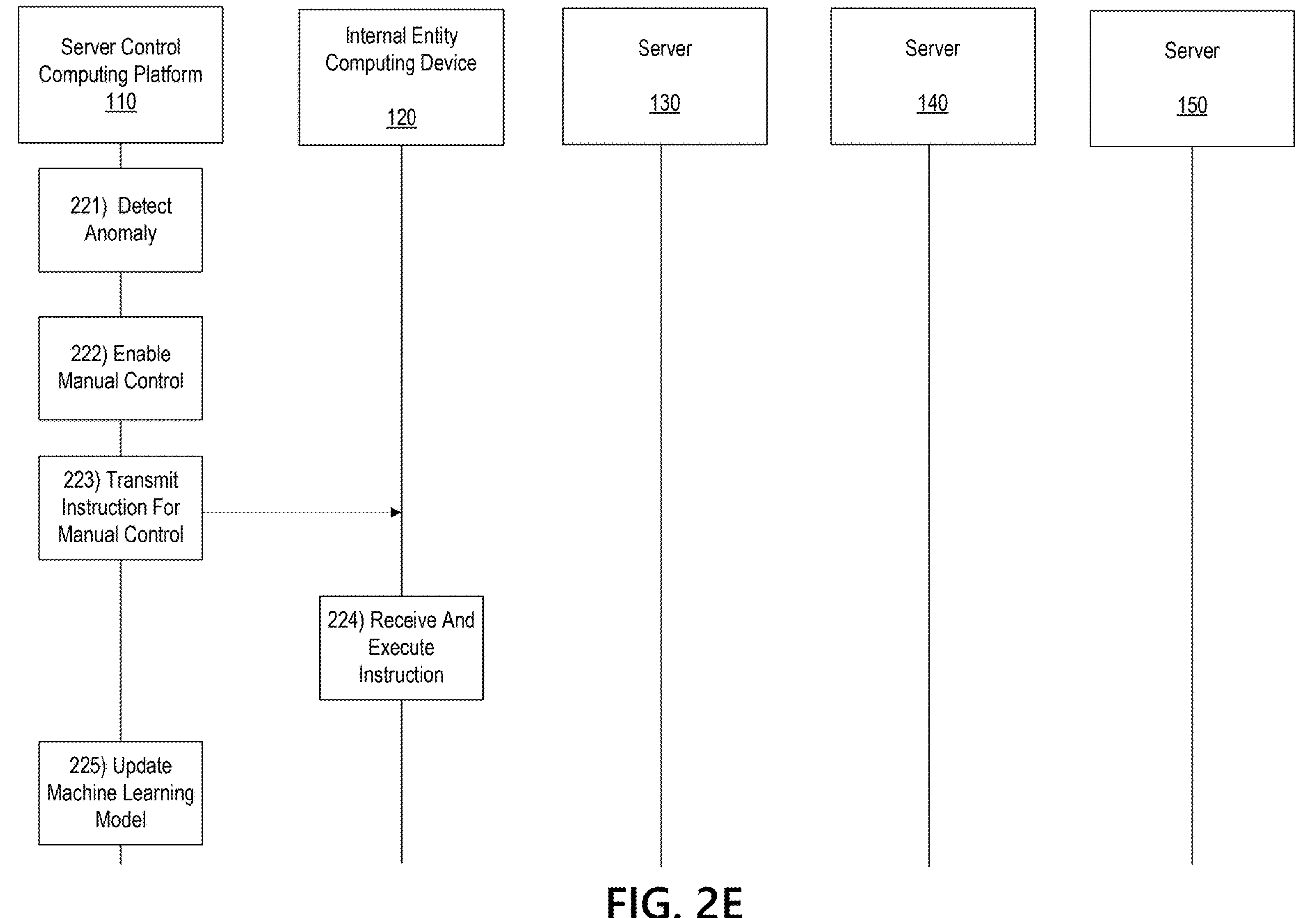

With reference to FIG. 2E, at step 221, server control computing platform 110 may detect an anomaly in the server workload data. For instance, an unexpected increase in workload or data processing requests, or the like, may be detected. In response to the detected anomaly, server control computing platform 110 may enable manual control of the server activation hibernation process at step 222.

At step 223, server control computing platform 110 may generate and transmit an instruction to internal entity computing device 120 instructing the internal entity computing device 120 to begin or activate manual control of the server operations. In some examples, transmitting the instruction may cause the internal entity computing device 120 to initiate manual control operations.

At step 224, internal entity computing device 120 may receive and execute the instruction to enable manual control. In some examples, manual control may be maintained for a predetermined time period (e.g., after expiration of the time period the dynamic control by the server control computing platform 110 may resume), until a user re-engages the dynamic control by the server control computing platform 110, until a next off-peak time period is detected, or the like.

At step 225, server control computing platform 110 may update, validate and/or retrain the machine learning model. For instance, based on dynamic server modifications, workload data received, and the like, the server control computing platform 110 may update and/or validate the machine learning model in a dynamic feedback loop. In some examples, updating and/or validating the machine learning model may be performed after each adjustment to a number of active servers, at an end of an off-peak time period, or on a periodic or aperiodic basis. Accordingly, accuracy of the machine learning model may be continuously improved to identify and/or activate/deactivate one or more servers on a dynamic basis.

In some instances, server control computing platform 110 may continuously update, validate, refine, or the like, the machine learning model. In some examples, the server control computing platform 110 may maintain an accuracy threshold for the machine learning model and may pause refinement (through the dynamic feedback loop) of the model if the corresponding accuracy is identified as greater than the accuracy threshold. Further, if the accuracy is at or below the accuracy threshold, the server control computing platform 110 may resume refinement of the model through the corresponding dynamic feedback loop.

Figure 3A:
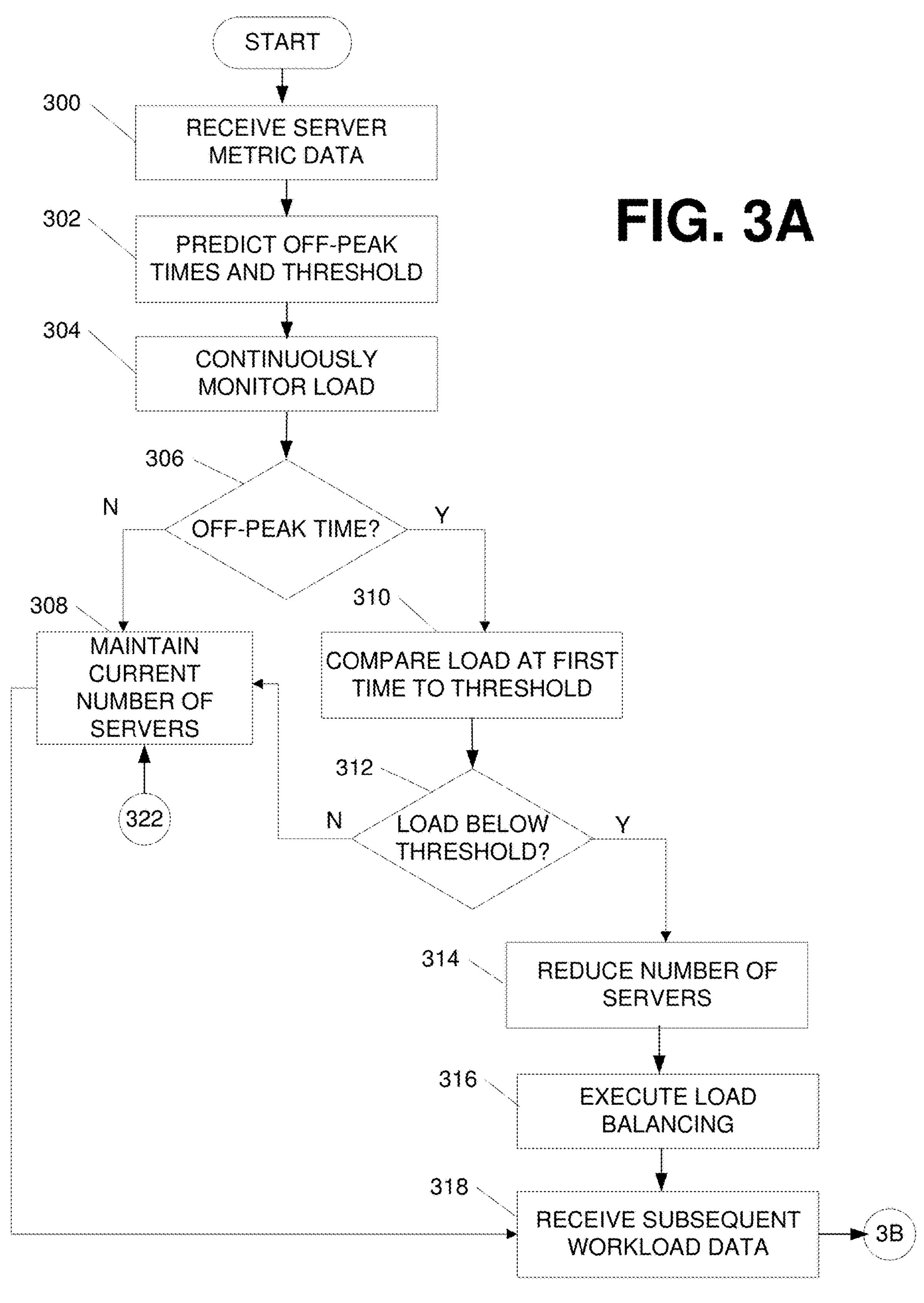
FIGS. 3A and 3B illustrate an illustrative method for dynamic hibernation of on-premise servers according to one or more aspects described herein.
Figure 3B:
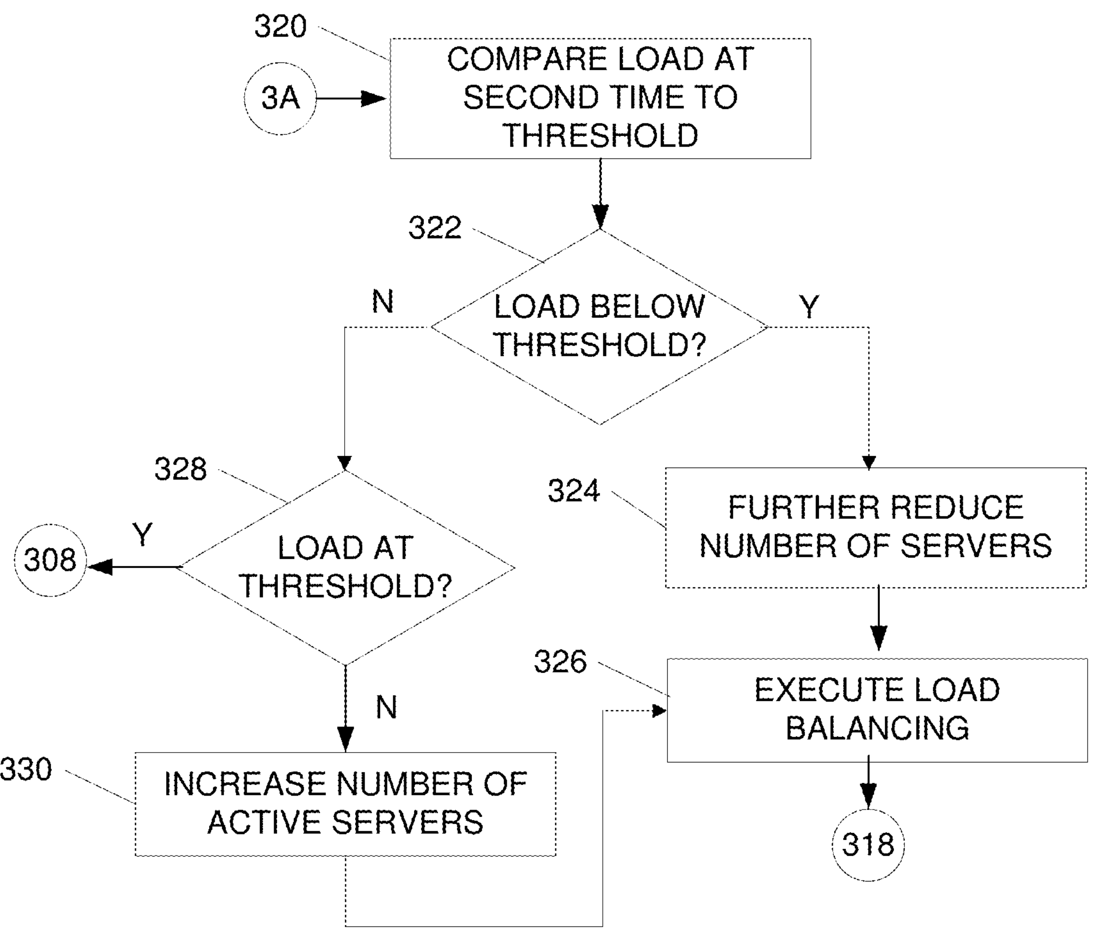

FIGS. 3A and 3B are a flow chart illustrating one example method of dynamic control of on-premise servers in accordance with one or more aspects described herein. The processes illustrated in FIGS. 3A and 3B are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIGS. 3A and 3B may be performed in real-time or near real-time.

With reference to FIG. 3A, at step 300, server control computing platform 110 may receive server metric data from a plurality of servers, such as first server 130, second server 140 and/or third server 150. In some examples, the server metric data may include CPU usage, memory usage, network usage, and the like. The server metric data may indicate a current workload of the plurality of servers in a server system.

At step 302, server control computing platform 110 may determine or identify off-peak times and an active server modification threshold. For instance, server control computing platform 110 may analyze the server metric data, using, for instance, machine learning, to identify off-peak times (e.g., times when workloads are typically reduced). For instance, a random forest technique may be used to identify usage patterns in the server metric data to identify peak times (e.g., times when workload on the servers is high) and off-peak times (e.g., times when workload on the servers is low or lower). In some examples, the random forest technique may be used to identify the active server modification threshold for reducing or increasing server availability to accommodate load changes (e.g., threshold for determining whether to activate or hibernate one or more servers).

At step 304, server control computing platform 110 may continuously monitor the load on the first server 130, second server 140, and/or third server 150. For instance, data from server 130, 140 and/or 150 may be continuously received.

At step 306, at a first time, server control computing platform 110 may determine whether a current time is a predicted off-peak time. For instance, based on server metric data received for the first time (e.g., including time stamps or the like), server control computing platform 110 may determine whether a current time is an off-peak time. If it is not an off-peak time, at step 308, a current number of active servers may be maintained (e.g., no changes to active or hibernation status of the servers in the system may be executed).

If, at step 306, a current time (e.g., the first time) is a predicted off-peak time, at step 310, first current workload data received (e.g., a most recent workload data used to determine whether the first time is an off-peak time) may be identified. In some examples, the first current workload data may include workload data associated with or distributed across a first current number of active servers.

At step 312, the current usage or workload may be compared to the active server modification threshold for adjusting status of one or more servers to determine whether the current usage or workload at the first time is below the threshold. If not (e.g., the first current workload data is at or above the active server modification threshold), the process may proceed to step 308, the number of active servers may be maintained and the process may then continue at step 318 and receive subsequent workload data.

If, at step 312, the first current usage or workload is below the threshold, server control computing platform 110 may identify one or more servers to hibernate (e.g., deactivate) in order to reduce carbon footprint at step 314. For instance, server control computing platform 110 may generate a hibernation instruction and transmit the hibernation instruction to the identified one or more servers. In some examples, transmitting the hibernation instruction may cause the one or more servers to transition from an active state to a hibernation stated, resulting in a second current number of active servers which may include fewer servers than the first current number of active servers.

At step 316, server control computing platform 110 may execute a load balancing operation. For instance, the workload may be distributed across the second current number of active servers.

At step 318, subsequent workload or usage data distributed across the second current number of active servers may be received. For instance, workload data at a second time and after the load balancing operation may be captured.

With reference to FIG. 3B, at step 320, the workload at the second time may be compared to the active server modification threshold.

At step 322, the server control computing platform 110 may determine whether the second current workload is below the threshold. If so, at step 324, server control computing platform 110 may identify one or more additional servers of the second current number of active servers, to transition to a hibernation state. Server control computing platform 110 may generate and transmit a hibernation instruction causing the one or more additional servers to transition to the hibernation state resulting in a third current number of active servers (e.g., less than the second current number of active servers).

At step 326, the load balancing operation may be executed again the process may return to step 318 to continuously evaluate and dynamically adjust a number of active servers.

If, at step 322, the second current workload is not below the threshold, at step 328, the sever control computing platform 110 may determine whether the second current workload is at the active server adjustment threshold. If so, the process may return to step 308 in FIG. 3A and maintain the current number of active servers (e.g., the second current number of active servers).

If, at step 328, the load is not at the threshold, the load is considered above the threshold and, at step 330, the server control computing platform 110 may identify at least one server of the one or more servers currently in hibernation to transition from the hibernation state to an active state. The server control computing platform 110 may generate an instruction and transmit the instruction to the at least one server causing the at least one server to transition to the active state, resulting in a fourth current number of active servers.

The process may then proceed to step 326 to execute the load balancing operation and continue at step 318.

The dynamic server activation and hibernation may continue until the off-peak time expires, an on-peak time is detected, or the like.

Accordingly, aspects described herein rely on machine learning to predict off-peak times and dynamically adjust server operations during the off-peak times to reduce carbon emissions associated with data processing. In particular, while cloud computing environments can take advantage of energy savings, on-premise servers are often restricted by available energy in an area or location. Further, data security may restrict a transition from on-premise servers to cloud based computing. Accordingly, the arrangements described herein may be particularly useful for on-premise servers to reduce computing resources and associated emissions.

The arrangements described herein use machine learning to predict off-peak times. The machine learning model may be trained to identify off-peak times but also to identify times that typically would be off-peak but might not be due to additional processing (e.g., month end, end of quarter, or the like, when processing is higher). Accordingly, analytics may be used to identify off-peak times in which one or more servers may be transitioned to a hibernation state.

As discussed herein, machine learning may also be used to determine the active server adjustment threshold at which one or more servers should be activated or deactivated. Accordingly, current workloads may be compared to the threshold to determine whether to hibernate or active one or more servers to efficiently process the workload.

The arrangements described continuously compare workload or utilization to the threshold to monitor and dynamically control active servers. As an off-peak period ends (e.g., a workday begins, week begins, or the like) all servers may be activated and dynamic adjustment may resume when the next predicted off-peak period is detected.

The arrangements described enable a phased approach to hibernation and/or activation that further conserves computing resources. For instance, as workload increases, servers may be individually or in small groups be activated to match the current workload, rather than activating all servers at one time.

Further, as discussed, the arrangements described provide for a manual override arrangement to enable a user to activate or deactivate servers in order to accommodate unexpected processing loads. The notification system can also indicate high workloads (e.g. or rapid increases in workload) in order to automatically activate all servers to accommodate the rapid increase in processing needed.

The arrangements also ensure the servers are never down when performing maintenance or the like. For instance, server maintenance can be performed in predicted off-peak times when servers are in hibernation to avoid loss of resources during high processing times.

Figure 4:
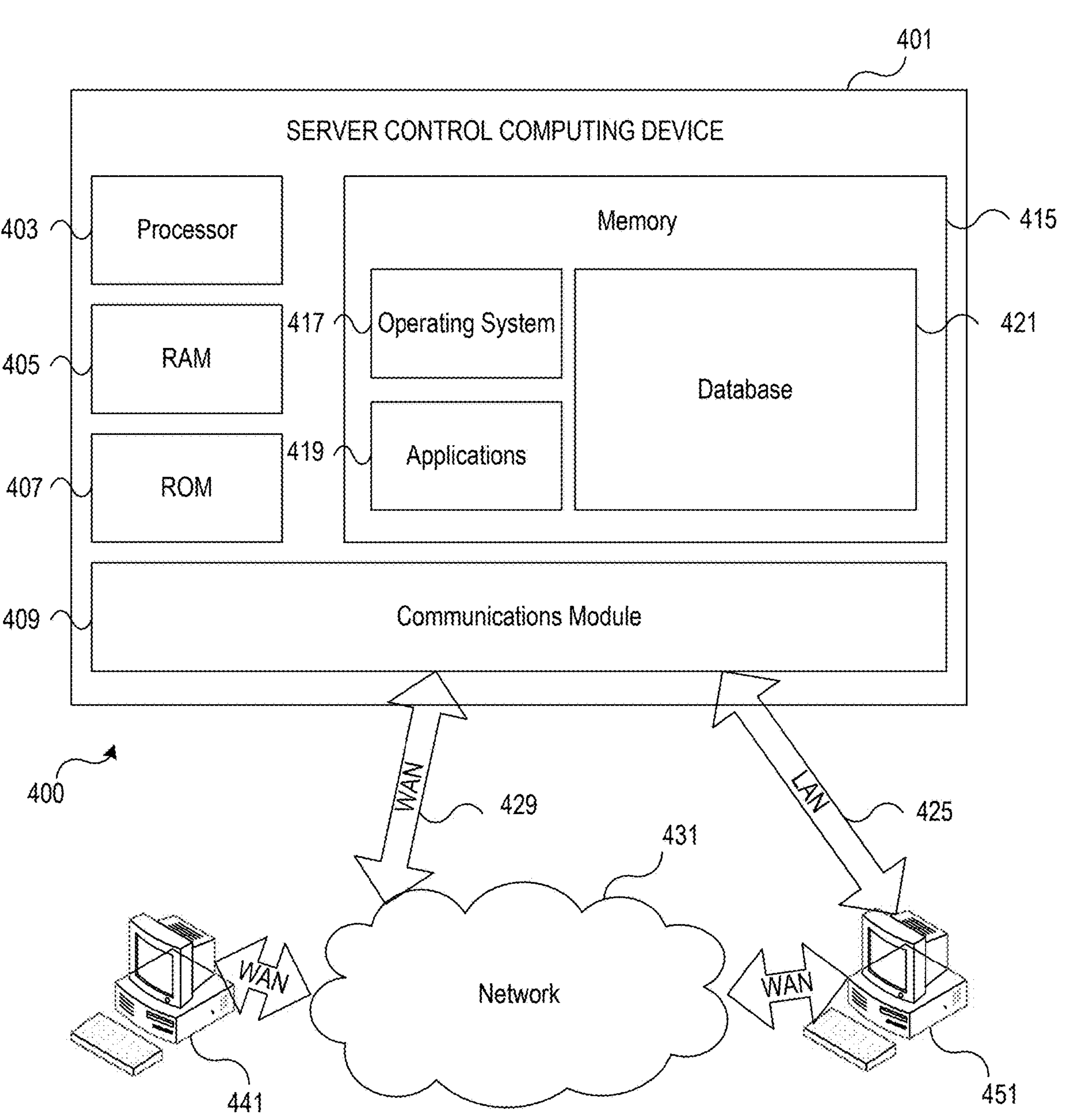
FIG. 4 illustrates one example environment in which various aspects of the disclosure may be implemented in accordance with one or more aspects described herein.

FIG. 4 depicts an illustrative operating environment in which various aspects of the present disclosure may be implemented in accordance with one or more example embodiments. Referring to FIG. 4, computing system environment 400 may be used according to one or more illustrative embodiments. Computing system environment 400 is only one example of a suitable computing environment and is not intended to suggest any limitation as to the scope of use or functionality contained in the disclosure. Computing system environment 400 should not be interpreted as having any dependency or requirement relating to any one or combination of components shown in illustrative computing system environment 400.

Computing system environment 400 may include server control computing device 401 having processor 403 for controlling overall operation of multi-profile computing device 401 and its associated components, including Random Access Memory (RAM) 405, Read-Only Memory (ROM) 407, communications module 409, and memory 415. Server control computing device 401 may include a variety of computer readable media. Computer readable media may be any available media that may be accessed by server control computing device 401, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by server control computing device 401.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor (e.g., hardware processor) on server control computing device 401. Such a processor may execute computer-executable instructions stored on a computer-readable medium.

Software may be stored within memory 415 and/or storage to provide instructions to processor 403 for enabling server control computing device 401 to perform various functions as discussed herein. For example, memory 415 may store software used by server control computing device 401, such as operating system 417, application programs 419, and associated database 421. Also, some or all of the computer executable instructions for server control computing device 401 may be embodied in hardware or firmware. Although not shown, RAM 405 may include one or more applications representing the application data stored in RAM 405 while server control computing device 401 is on and corresponding software applications (e.g., software tasks) are running on server control computing device 401.

Communications module 409 may include a microphone, keypad, touch screen, and/or stylus through which a user of server control computing device 401 may provide input, and may also include one or more of a speaker for providing audio output and a video display device for providing textual, audiovisual and/or graphical output. Computing system environment 400 may also include optical scanners (not shown).

Server control computing device 401 may operate in a networked environment supporting connections to one or more remote computing devices, such as computing devices 441 and 451. Computing devices 441 and 451 may be personal computing devices or servers that include any or all of the elements described above relative to server control computing device 401.

The network connections depicted in FIG. 4 may include Local Area Network (LAN) 425 and Wide Area Network (WAN) 429, as well as other networks. When used in a LAN networking environment, server control computing device 401 may be connected to LAN 425 through a network interface or adapter in communications module 409. When used in a WAN networking environment, server control computing device 401 may include a modem in communications module 409 or other means for establishing communications over WAN 429, such as network 431 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
at least one processor;
a communication interface communicatively coupled to the at least one processor; and
a memory storing computer-readable instructions that, when executed by the at least one processor, cause the computing platform to:
receive, from a plurality of on-premise servers in a system, server metric data indicating a current workload of the plurality of on-premise servers in the system;
analyze, using a machine learning model, the server metric data to predict one or more off-peak time periods for the system and an active server modification threshold for determining whether a number of active servers in the system should be modified;
determine, based on current server workload data, whether a current time is a predicted off-peak time;
responsive to determining that the current time is not a predicted off-peak time, maintain a first current number of active servers in the system;
responsive to determining that the current time is a predicted off-peak time:
continuously monitor a workload on the first current number of active servers of the system, wherein continuously monitoring the workload includes receiving workload data associated with the first current number of active servers;
at a first time:
identify a first current workload across the first current number of active servers;
compare the first current workload across the first current number of active servers to the active server modification threshold;
responsive to determining that the first current workload is at or above the active server modification threshold, maintain the first current number of active servers in an active state;
responsive to determining that the first current workload is below the active server modification threshold:
identify one or more servers in the first current number of active servers, to transition to a hibernation state; and
transmit a hibernation instruction to the one or more servers, wherein transmitting the hibernation instruction causes the one or more servers to transition to the hibernation state resulting in a second current number of active servers.

2. The computing platform of claim 1, wherein the second current number of active servers includes fewer servers than the first current number of active servers.

3. The computing platform of claim 1, further including instructions that, when executed, cause the computing platform to:
responsive to determining that the current time is a predicted off-peak time and after causing the one or more servers to transition to the hibernation state resulting in the second current number of active servers,
execute a load balancing operation, wherein executing the load balancing operation includes distributing the workload data associated with the first current number of active servers across the second current number of active servers.

4. The computing platform of claim 3, further including instructions that, when executed, cause the computing platform to:
responsive to determining that the current time is a predicted off-peak time and after causing the one or more servers to transition to the hibernation state resulting in the second current number of active servers,
receive subsequent workload data associated with a workload distributed across the second current number of active servers;
at a second time after the first time,
identify a second current workload across the second current number of active servers;
compare the second current workload across the second current number of active servers to the active server modification threshold;
responsive to determining that the second current workload is below the threshold:
identify one or more additional servers of the second current number of active servers to transition to the hibernation state;
transmit the hibernation instruction to the one or more additional servers, wherein transmitting the hibernation instruction causes the one or more additional servers to transition to the hibernation state resulting in a third current number of active servers;
responsive to determining that the second current workload is above the active server modification threshold;
identify at least one server of the one or more servers to transition from the hibernation state to the active state;
transmit an activation instruction to the at least one server, wherein transmitting the activation instruction causes the at least one server to transition from the hibernation state to an active state resulting in a fourth current number of active servers; and
responsive to determining that the second current workload is at the active server modification threshold, maintain the second current number of active servers in the active state.

5. The computing platform of claim 4, further including instructions that, when executed, cause the computing platform to:
after causing the one or more additional servers to transition to the hibernation state resulting in a third current number of active servers, execute the load balancing operation, wherein executing the load balancing operation further includes distributing the subsequent workload data associated with the second current number of active servers across the third current number of active servers.

6. The computing platform of claim 4, further including instructions that, when executed, cause the computing platform to:

after causing the at least one server to transition from the hibernation state to the active state resulting in the fourth current number of active servers, execute the load balancing operation, wherein executing the load balancing operation further includes distributing the subsequent workload data associated with the second current number of active servers across the fourth current number of active servers.

7. The computing platform of claim 1, further including instructions that, when executed, cause the computing platform to:

determine that the predicted off-peak time has ended; and responsive to determining that the predicted off-peak time has ended, transmit an activation instruction to all servers in a hibernation state, wherein transmitting the activation instruction causes all servers in the hibernation state to transition from the hibernation state to the active state.

8. The computing platform of claim 1, wherein the server metric data includes central processing unit (CPU) usage, disk usage, memory usage, percent busy, or network usage.

9. A method, comprising:

receiving, by a computing platform, the computing platform having at least one processor, and memory, and from a plurality of on-premise servers in a system, server metric data indicating a current workload of the plurality of on-premise servers in the system;

analyzing, by the at least one processor and using a machine learning model, the server metric data to predict one or more off-peak time periods for the system and an active server modification threshold for determining whether a number of active servers in the system should be modified;

determining, by the at least one processor and based on current server workload data, whether a current time is a predicted off-peak time;

responsive to determining that the current time is not a predicted off-peak time, maintaining, by the at least one processor, a first current number of active servers in the system;

responsive to determining that the current time is a predicted off-peak time:

continuously monitoring, by the at least one processor, a workload on the first current number of active servers of the system, wherein continuously monitoring the workload includes receiving workload data associated with the first current number of active servers;

at a first time:

identifying, by the at least one processor, a first current workload across the first current number of active servers;

comparing, by the at least one processor, the first current workload across the first current number of active servers to the active server modification threshold;

responsive to determining that the first current workload is at or above the active server modification threshold, maintaining, by the at least one processor, the first current number of active servers in an active state;

responsive to determining that the first current workload is below the active server modification threshold:

identifying, by the at least one processor, one or more servers in the first current number of active servers, to transition to a hibernation state; and transmitting, by the at least one processor, a hibernation instruction to the one or more servers, wherein transmitting the hibernation instruction causes the one or more servers to transition to the hibernation state resulting in a second current number of active servers.

10. The method of claim 9, wherein the second current number of active servers includes fewer servers than the first current number of active servers.

11. The method of claim 9, further including:

responsive to determining that the current time is a predicted off-peak time and after causing the one or more servers to transition to the hibernation state resulting in the second current number of active servers, executing, by the at least one processor, a load balancing operation, wherein executing the load balancing operation includes distributing the workload data associated with the first current number of active servers across the second current number of active servers.

12. The method of claim 11, further including:

responsive to determining that the current time is a predicted off-peak time and after causing the one or more servers to transition to the hibernation state resulting in the second current number of active servers, receiving, by the at least one processor, subsequent workload data associated with a workload distributed across the second current number of active servers;

at a second time after the first time:

identifying, by the at least one processor, a second current workload across the second current number of active servers;

comparing, by the at least one processor, the second current workload across the second current number of active servers to the active server modification threshold;

responsive to determining that the second current workload is below the threshold:

identifying, by the at least one processor, one or more additional servers of the second current number of active servers to transition to the hibernation state;

transmitting, by the at least one processor, the hibernation instruction to the one or more additional servers, wherein transmitting the hibernation instruction causes the one or more additional servers to transition to the hibernation state resulting in a third current number of active servers;

responsive to determining that the second current workload is above the active server modification threshold:

identifying, by the at least one processor, at least one server of the one or more servers to transition from the hibernation state to the active state;

transmitting, by the at least one processor, an activation instruction to the at least one server, wherein transmitting the activation instruction causes the at least one server to transition from the hibernation state to an active state resulting in a fourth current number of active servers; and responsive to determining that the second current workload is at the active server modification threshold, maintaining, by the at least one processor, the second current number of active servers in the active state.

13. The method of claim 12, further including:

after causing the one or more additional servers to transition to the hibernation state resulting in a third current number of active servers, executing, by the at least one processor, the load balancing operation, wherein executing the load balancing operation further includes distributing the subsequent workload data associated with the second current number of active servers across the third current number of active servers.

14. The method of claim 12, further including:

after causing the at least one server to transition from the hibernation state to the active state resulting in the fourth current number of active servers, executing, by the at least one processor, the load balancing operation, wherein executing the load balancing operation further includes distributing the subsequent workload data associated with the second current number of active servers across the fourth current number of active servers.

15. The method of claim 9, further including:

determining, by the at least one processor, that the predicted off-peak time has ended; and responsive to determining that the predicted off-peak time has ended, transmitting, by the at least one processor, an activation instruction to all servers in a hibernation state, wherein transmitting the activation instruction causes all servers in the hibernation state to transition from the hibernation state to the active state.

16. The method of claim 9, wherein the server metric data includes central processing unit (CPU) usage, disk usage, memory usage, percent busy, or network usage.

17. One or more non-transitory computer-readable media storing instructions that, when executed by a computing platform comprising at least one processor, memory, and a communication interface, cause the computing platform to:

receive, from a plurality of on-premise servers in a system, server metric data indicating a current workload of the plurality of on-premise servers in the system;

analyze, using a machine learning model, the server metric data to predict one or more off-peak time periods for the system and an active server modification threshold for determining whether a number of active servers in the system should be modified;

determine, based on current server workload data, whether a current time is a predicted off-peak time;

responsive to determining that the current time is not a predicted off-peak time, maintain a first current number of active servers in the system;

responsive to determining that the current time is a predicted off-peak time:

continuously monitor a workload on the first current number of active servers of the system, wherein continuously monitoring the workload includes receiving workload data associated with the first current number of active servers;

at a first time:

identify a first current workload across the first current number of active servers;

compare the first current workload across the first current number of active servers to the active server modification threshold;

responsive to determining that the first current workload is at or above the active server modification threshold, maintain the first current number of active servers in an active state;

responsive to determining that the first current workload is below the active server modification threshold:

identify one or more servers in the first current number of active servers, to transition to a hibernation state; and transmit a hibernation instruction to the one or more servers, wherein transmitting the hibernation instruction causes the one or more servers to transition to the hibernation state resulting in a second current number of active servers.

18. The one or more non-transitory computer-readable media of claim 17, further including instructions that, when executed, cause the computing platform to:

responsive to determining that the current time is a predicted off-peak time and after causing the one or more servers to transition to the hibernation state resulting in the second current number of active servers, execute a load balancing operation, wherein executing the load balancing operation includes distributing the workload data associated with the first current number of active servers across the second current number of active servers.

19. The one or more non-transitory computer-readable media of claim 18, further including instructions that, when executed, cause the computing platform to:

responsive to determining that the current time is a predicted off-peak time and after causing the one or more servers to transition to the hibernation state resulting in the second current number of active servers, receive subsequent workload data associated with a workload distributed across the second current number of active servers;

at a second time after the first time, identify a second current workload across the second current number of active servers;

compare the second current workload across the second current number of active servers to the active server modification threshold;

responsive to determining that the second current workload is below the threshold:

identify one or more additional servers of the second current number of active servers to transition to the hibernation state;

transmit the hibernation instruction to the one or more additional servers, wherein transmitting the hibernation instruction causes the one or more additional servers to transition to the hibernation state resulting in a third current number of active servers;

responsive to determining that the second current workload is above the active server modification threshold;

identify at least one server of the one or more servers to transition from the hibernation state to the active state;

transmit an activation instruction to the at least one server, wherein transmitting the activation instruction causes the at least one server to transition from the hibernation state to an active state resulting in a fourth current number of active servers; and responsive to determining that the second current workload is at the active server modification threshold, maintain the second current number of active servers in the active state.

20. The one or more non-transitory computer-readable media of claim 17, further including instructions that, when executed, cause the computing platform to:

determine that the predicted off-peak time has ended; and responsive to determining that the predicted off-peak time has ended, transmit an activation instruction to all servers in a hibernation state, wherein transmitting the activation instruction causes all servers in the hibernation state to transition from the hibernation state to the active state.

* * * * *